(12) United States Patent
Pervan et al.

(10) Patent No.: US 12,454,122 B2
(45) Date of Patent: *Oct. 28, 2025

(54) WOOD FIBRE BASED PANEL WITH A SURFACE LAYER

(71) Applicant: Välinge Innovation AB, Viken (SE)

(72) Inventors: Darko Pervan, Viken (SE); Göran Ziegler, Viken (SE)

(73) Assignee: VÄLINGE INNOVATION AB, Viken (SE)

( * ) Notice: Subject to any disclaimer, the term of this patent is extended or adjusted under 35 U.S.C. 154(b) by 237 days.

This patent is subject to a terminal disclaimer.

(21) Appl. No.: 17/711,487

(22) Filed: Apr. 1, 2022

(65) Prior Publication Data

US 2022/0324217 A1  Oct. 13, 2022

Related U.S. Application Data

(63) Continuation of application No. 16/132,977, filed on Sep. 17, 2018, now Pat. No. 11,318,726, which is a
(Continued)

(30) Foreign Application Priority Data

| Jan. 10, 2014 | (SE) | 1450023-5 |
| May 12, 2014 | (SE) | 1450552-3 |
| Sep. 29, 2014 | (SE) | 1451154-7 |

(51) Int. Cl.
*B32B 37/10* (2006.01)
*B27G 1/00* (2006.01)
(Continued)

(52) U.S. Cl.
CPC ............. *B32B 37/10* (2013.01); *B27G 1/00* (2013.01); *B27N 3/02* (2013.01); *B27N 3/04* (2013.01);
(Continued)

(58) Field of Classification Search
CPC ........................................................ B27M 3/04
See application file for complete search history.

(56) References Cited

U.S. PATENT DOCUMENTS

| 2,018,712 A | 10/1935 | Elmendorf |
| 2,419,614 A | 4/1947 | Welch |

(Continued)

FOREIGN PATENT DOCUMENTS

| AU | 80284/75 A | 10/1976 |
| AU | 2011236087 A1 | 5/2013 |

(Continued)

OTHER PUBLICATIONS

Decision to grant received for European Patent Application No. 15735032, mailed on Jul. 6, 2023, 3 pages.

(Continued)

*Primary Examiner* — Michael N Orlando
*Assistant Examiner* — John Blades
(74) *Attorney, Agent, or Firm* — Boone IP Law

(57) ABSTRACT

A building panel with a surface layer including a wood veneer, a wood fibre based core and a sub-layer between the surface layer and the core. The sub-layer includes wood fibres and a binder. The surface layer has surface portions including material from the sub-layer. The surface portions including material from the sub-layer extend into the wood veneer.

20 Claims, 1 Drawing Sheet

Related U.S. Application Data continuation of application No. 14/593,521, filed on Jan. 9, 2015, now Pat. No. 10,100,535.

(51) Int. Cl.
| | | |
|---|---|---|
| *B27N 3/02* | (2006.01) | |
| *B27N 3/04* | (2006.01) | |
| *B27N 7/00* | (2006.01) | |
| *B32B 3/30* | (2006.01) | |
| *B32B 5/14* | (2006.01) | |
| *B32B 21/02* | (2006.01) | |
| *B32B 21/08* | (2006.01) | |
| *B32B 21/14* | (2006.01) | |
| *B32B 27/20* | (2006.01) | |
| *B32B 27/42* | (2006.01) | |
| *B32B 37/12* | (2006.01) | |
| *B32B 37/18* | (2006.01) | |
| *B44C 1/24* | (2006.01) | |
| *B44C 5/04* | (2006.01) | |
| *E04F 15/04* | (2006.01) | |
| *E04F 15/08* | (2006.01) | |
| *B27N 3/00* | (2006.01) | |
| *B27N 3/08* | (2006.01) | |
| *B32B 3/06* | (2006.01) | |
| *B32B 38/06* | (2006.01) | |

(52) U.S. Cl.
CPC ............. *B27N 7/005* (2013.01); *B32B 3/30* (2013.01); *B32B 5/142* (2013.01); *B32B 21/02* (2013.01); *B32B 21/08* (2013.01); *B32B 21/14* (2013.01); *B32B 27/20* (2013.01); *B32B 27/42* (2013.01); *B32B 37/1284* (2013.01); *B32B 37/18* (2013.01); *B44C 1/24* (2013.01); *B44C 5/043* (2013.01); *B44C 5/0438* (2013.01); *E04F 15/042* (2013.01); *E04F 15/045* (2013.01); *E04F 15/082* (2013.01); *E04F 15/085* (2013.01); *B27N 3/005* (2013.01); *B27N 3/08* (2013.01); *B32B 3/06* (2013.01); *B32B 38/06* (2013.01); *B32B 2262/067* (2013.01); *B32B 2264/062* (2013.01); *B32B 2266/0214* (2013.01); *B32B 2266/0285* (2013.01); *B32B 2266/14* (2016.11); *B32B 2305/073* (2013.01); *B32B 2307/4026* (2013.01); *B32B 2307/554* (2013.01); *B32B 2317/02* (2013.01); *B32B 2317/16* (2013.01); *B32B 2471/00* (2013.01); *B32B 2607/00* (2013.01); *Y10T 156/10* (2015.01); *Y10T 156/1039* (2015.01); *Y10T 428/24132* (2015.01); *Y10T 428/24298* (2015.01); *Y10T 428/24314* (2015.01); *Y10T 428/24322* (2015.01); *Y10T 428/24331* (2015.01); *Y10T 428/24339* (2015.01); *Y10T 428/24521* (2015.01); *Y10T 428/24603* (2015.01); *Y10T 428/24612* (2015.01); *Y10T 428/24802* (2015.01); *Y10T 428/24893* (2015.01); *Y10T 428/24992* (2015.01); *Y10T 428/249925* (2015.04); *Y10T 428/24994* (2015.04); *Y10T 428/24995* (2015.04); *Y10T 428/249959* (2015.04); *Y10T 428/249982* (2015.04); *Y10T 428/249985* (2015.04); *Y10T 428/249986* (2015.04); *Y10T 428/249987* (2015.04); *Y10T 428/25* (2015.01); *Y10T 428/253* (2015.01); *Y10T 428/256* (2015.01); *Y10T 428/257* (2015.01); *Y10T 428/3167* (2015.04); *Y10T 428/31862* (2015.04); *Y10T 428/31866* (2015.04); *Y10T 428/31957* (2015.04); *Y10T 428/31989* (2015.04)

(56) References Cited

U.S. PATENT DOCUMENTS

| | | |
|---|---|---|
| 2,587,064 A | 2/1952 | Rapson |
| 2,630,395 A | 3/1953 | Vernon et al. |
| 2,634,534 A | 4/1953 | Brown |
| 2,695,857 A | 11/1954 | Rehbock et al. |
| 2,720,478 A | 10/1955 | Hogg |
| 2,831,793 A * | 4/1958 | Elmendorf ............ B27D 1/06 428/326 |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd et al. |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Word, Jr. |
| 3,673,020 A | 6/1972 | De Jaeger |
| 3,729,368 A | 4/1973 | Ingham et al. |
| 3,844,863 A | 10/1974 | Forsythe et al. |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner et al. |
| 4,420,351 A | 12/1983 | Lussi et al. |
| 4,420,525 A | 12/1983 | Parks |
| 4,430,375 A | 2/1984 | Scher et al. |
| 4,430,380 A | 2/1984 | Hoenel et al. |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | Le et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von et al. |
| 5,292,576 A | 3/1994 | Sanders |
| 5,314,554 A | 5/1994 | Owens |

(56) References Cited

U.S. PATENT DOCUMENTS

| | | |
|---|---|---|
| 5,354,259 A | 10/1994 | Scholz et al. |
| 5,405,705 A * | 4/1995 | Fujimoto .............. B32B 21/14 |
| | | 428/537.1 |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Shultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan et al. |
| 7,918,062 B2 | 4/2011 | Chen |
| 8,021,741 B2 | 9/2011 | Chen et al. |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller et al. |
| 2002/0155297 A1 | 10/2002 | Schuren et al. |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist et al. |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0182938 A1 | 8/2006 | Oldorff |
| 2006/0183853 A1 | 8/2006 | Sczepan |
| 2006/0194902 A1 * | 8/2006 | Nie ..................... C08L 3/02 |
| | | 524/47 |
| 2007/0055012 A1 | 3/2007 | Caldwell |
| 2007/0066176 A1 | 3/2007 | Wenstrup et al. |
| 2007/0102108 A1 | 5/2007 | Zheng et al. |
| 2007/0125275 A1 | 6/2007 | Bui |
| 2007/0148339 A1 | 6/2007 | Wescott et al. |
| 2007/0166516 A1 | 7/2007 | Kim et al. |

(56) References Cited

U.S. PATENT DOCUMENTS

| | | |
|---|---|---|
| 2007/0184244 A1 | 8/2007 | Dohring |
| 2007/0207296 A1 | 9/2007 | Eisermann |
| 2007/0218260 A1 | 9/2007 | Miclo et al. |
| 2007/0224438 A1 | 9/2007 | Van et al. |
| 2007/0256804 A1 | 11/2007 | Garcis et al. |
| 2008/0000179 A1 | 1/2008 | Pervan et al. |
| 2008/0000190 A1 | 1/2008 | Hakansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson et al. |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan et al. |
| 2009/0155612 A1 | 6/2009 | Pervan et al. |
| 2009/0165946 A1 | 7/2009 | Suzuki et al. |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1* | 4/2010 | Pervan ................... E04C 2/16 118/200 |
| 2010/0136303 A1 | 6/2010 | Kreuder et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke et al. |
| 2010/0319282 A1 | 12/2010 | Ruland |
| 2010/0323187 A1 | 12/2010 | Kalwa |
| 2010/0330376 A1 | 12/2010 | Trksak et al. |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu et al. |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster et al. |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Hakansson et al. |
| 2012/0288689 A1 | 11/2012 | Hansson et al. |
| 2012/0308774 A1 | 12/2012 | Haakansson et al. |
| 2013/0025216 A1 | 1/2013 | Reichwein et al. |
| 2013/0092314 A1 | 4/2013 | Ziegler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0018661 A1 | 1/2014 | Tsujita et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0196618 A1 | 7/2014 | Pervan et al. |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Dohring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Dohring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0010131 A1 | 1/2021 | Okahisa et al. |
| 2021/0078305 A1 | 3/2021 | Schulte |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0176582 A1 | 6/2022 | Nilsson et al. |
| 2022/0298789 A1 | 9/2022 | Ziegler |
| 2022/0347994 A1 | 11/2022 | Ziegler et al. |

FOREIGN PATENT DOCUMENTS

| | | |
|---|---|---|
| CA | 2557096 A1 | 7/2005 |
| CA | 2852656 A1 | 4/2013 |
| CH | 298894 A | 5/1954 |
| CN | 1709717 A | 12/2005 |
| CN | 101045311 A | 10/2007 |
| CN | 101909836 A | 12/2010 |
| CN | 101998896 A | 3/2011 |
| CN | 102166775 A | 8/2011 |
| CN | 202200608 U | 4/2012 |
| CN | 102762369 A | 10/2012 |
| CN | 102917878 A | 2/2013 |

(56) References Cited

FOREIGN PATENT DOCUMENTS

| | | |
|---|---|---|
| CN | 102917888 A | 2/2013 |
| CN | 104084994 A | 10/2014 |
| DE | 1815312 A1 | 7/1969 |
| DE | 7148789 U | 4/1972 |
| DE | 2939828 A1 | 4/1981 |
| DE | 3334921 A1 | 4/1985 |
| DE | 3634885 A1 | 4/1988 |
| DE | 4233050 A1 | 4/1993 |
| DE | 4236266 A1 | 5/1993 |
| DE | 20214532 U1 | 2/2004 |
| DE | 10245914 A1 | 4/2004 |
| DE | 10300247 A1 | 7/2004 |
| DE | 10331657 A1 | 2/2005 |
| DE | 202004003061 U1 | 7/2005 |
| DE | 102004050278 A1 | 4/2006 |
| DE | 202006007797 U1 | 8/2006 |
| DE | 102005046264 A1 | 4/2007 |
| DE | 102006024593 A1 | 12/2007 |
| DE | 102006058244 A1 | 6/2008 |
| DE | 102007043202 A1 | 3/2009 |
| DE | 202009008367 U1 | 9/2009 |
| DE | 102010045266 A1 | 3/2012 |
| DE | 202013011776 U1 | 7/2014 |
| DE | 202014102031 U1 | 7/2014 |
| DE | 202013012020 U1 | 2/2015 |
| DE | 102013113125 A1 | 5/2015 |
| EP | 0129430 A2 | 12/1984 |
| EP | 0234220 A2 | 9/1987 |
| EP | 0355829 A2 | 2/1990 |
| EP | 0592013 A2 | 4/1994 |
| EP | 0656443 A1 | 6/1995 |
| EP | 0611408 B1 | 9/1996 |
| EP | 0732449 A1 | 9/1996 |
| EP | 0744477 A2 | 11/1996 |
| EP | 0914914 A2 | 5/1999 |
| EP | 0993934 A2 | 4/2000 |
| EP | 1035255 A1 | 9/2000 |
| EP | 1125971 A1 | 8/2001 |
| EP | 1136251 A2 | 9/2001 |
| EP | 1193288 A1 | 4/2002 |
| EP | 1209199 A1 | 5/2002 |
| EP | 1249322 A1 | 10/2002 |
| EP | 1262607 A1 | 12/2002 |
| EP | 1242702 B1 | 11/2004 |
| EP | 1498241 A2 | 1/2005 |
| EP | 1584378 A1 | 10/2005 |
| EP | 1657055 A1 | 5/2006 |
| EP | 1681103 A2 | 7/2006 |
| EP | 1690603 A1 | 8/2006 |
| EP | 1507664 B1 | 7/2007 |
| EP | 1808311 A1 | 7/2007 |
| EP | 1961556 A1 | 8/2008 |
| EP | 1985464 A1 | 10/2008 |
| EP | 1997623 A1 | 12/2008 |
| EP | 2025484 A1 | 2/2009 |
| EP | 1454763 B1 | 8/2009 |
| EP | 2105320 A1 | 9/2009 |
| EP | 2119550 A1 | 11/2009 |
| EP | 2213476 A1 | 8/2010 |
| EP | 2226201 A1 | 9/2010 |
| EP | 2246500 A2 | 11/2010 |
| EP | 2263867 A1 | 12/2010 |
| EP | 2264259 A2 | 12/2010 |
| EP | 2272667 A1 | 1/2011 |
| EP | 2272668 A1 | 1/2011 |
| EP | 2305462 A1 | 4/2011 |
| EP | 2353861 A1 | 8/2011 |
| EP | 1847385 B1 | 9/2011 |
| EP | 2415947 A2 | 2/2012 |
| EP | 2902196 A1 | 8/2015 |
| FR | 0801433 A | 8/1936 |
| FR | 2873953 A1 | 2/2006 |
| GB | 0785008 A | 10/1957 |
| GB | 0984170 A | 2/1965 |
| GB | 1090450 A | 11/1967 |
| GB | 1561820 A | 3/1980 |
| GB | 2238983 A | 6/1991 |
| GB | 2248246 A | 4/1992 |
| GB | 2464541 A | 4/2010 |
| JP | 51-128409 A | 11/1976 |
| JP | 52-009062 A | 1/1977 |
| JP | 52-087212 A | 7/1977 |
| JP | 53-148506 A | 12/1978 |
| JP | 56-049259 A | 5/1981 |
| JP | 56-151564 A | 11/1981 |
| JP | 58-084761 A | 5/1983 |
| JP | 59-101312 A | 6/1984 |
| JP | 62-083146 A | 4/1987 |
| JP | 62-253403 A | 11/1987 |
| JP | 63-501631 A | 6/1988 |
| JP | 64-062108 A | 3/1989 |
| JP | 02-188206 A | 7/1990 |
| JP | 02-198801 A | 8/1990 |
| JP | 02-229002 A | 9/1990 |
| JP | 03-030905 A | 2/1991 |
| JP | 03-211047 A | 9/1991 |
| JP | 03-267174 A | 11/1991 |
| JP | 04-107101 A | 4/1992 |
| JP | 04-247901 A | 9/1992 |
| JP | 04-269506 A | 9/1992 |
| JP | 05-077362 A | 3/1993 |
| JP | 05-237809 A | 9/1993 |
| JP | 06-039808 A | 2/1994 |
| JP | 06-312406 A | 11/1994 |
| JP | 07-060704 A | 3/1995 |
| JP | 07-144304 A | 6/1995 |
| JP | 08-207012 A | 8/1996 |
| JP | 08-332603 A | 12/1996 |
| JP | 09-164651 A | 6/1997 |
| JP | 10-002098 A | 1/1998 |
| JP | 10-018562 A | 1/1998 |
| JP | 10-086107 A | 4/1998 |
| JP | 2925749 B2 | 7/1999 |
| JP | 11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2004-167792 A | 6/2004 |
| JP | 2004-276368 A | 10/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2005-335283 A | 12/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2009-226813 A | 10/2009 |
| JP | 2010-017963 A | 1/2010 |
| JP | 2011-110768 A | 6/2011 |
| JP | 2011-522138 A | 7/2011 |
| JP | 2014-198440 A | 10/2014 |
| KR | 10-2010-0098414 A | 9/2010 |
| KR | 10-0997149 B1 | 11/2010 |
| KR | 10-1439066 B1 | 9/2014 |
| MY | 137349 A | 1/2009 |
| NZ | 225556 A | 2/1992 |
| SE | 469326 B | 6/1993 |
| WO | 92/06832 A1 | 4/1992 |
| WO | 93/24295 A1 | 12/1993 |
| WO | 93/24296 A1 | 12/1993 |
| WO | 94/00280 A1 | 1/1994 |
| WO | 95/06568 A1 | 3/1995 |
| WO | 00/22225 A1 | 4/2000 |
| WO | 00/44576 A1 | 8/2000 |
| WO | 01/00409 A1 | 1/2001 |

(56) References Cited

FOREIGN PATENT DOCUMENTS

| | | | |
|---|---|---|---|
| WO | 01/48333 | A1 | 7/2001 |
| WO | 01/64408 | A1 | 9/2001 |
| WO | 01/68367 | A1 | 9/2001 |
| WO | 01/92037 | A2 | 12/2001 |
| WO | 02/42167 | A2 | 5/2002 |
| WO | 02/42373 | A1 | 5/2002 |
| WO | 03/78761 | A1 | 9/2003 |
| WO | 03/95202 | A1 | 11/2003 |
| WO | 2004/042168 | A1 | 5/2004 |
| WO | 2004/050359 | A1 | 6/2004 |
| WO | 2004/067874 | A2 | 8/2004 |
| WO | 2005/035209 | A2 | 4/2005 |
| WO | 2005/054599 | A1 | 6/2005 |
| WO | 2005/054600 | A1 | 6/2005 |
| WO | 2005/066431 | A2 | 7/2005 |
| WO | 2005/080096 | A2 | 9/2005 |
| WO | 2005/097874 | A2 | 10/2005 |
| WO | 2005/116337 | A1 | 12/2005 |
| WO | 2005/116361 | A1 | 12/2005 |
| WO | 2006/007413 | A1 | 1/2006 |
| WO | 2006/013469 | A1 | 2/2006 |
| WO | 2006/015313 | A2 | 2/2006 |
| WO | 2006/042651 | A1 | 4/2006 |
| WO | 2006/043893 | A1 | 4/2006 |
| WO | 2006/066776 | A2 | 6/2006 |
| WO | 2006/126930 | A1 | 11/2006 |
| WO | 2007/015669 | A2 | 2/2007 |
| WO | 2007/042258 | A1 | 4/2007 |
| WO | 2007/059294 | A2 | 5/2007 |
| WO | 2008/004960 | A2 | 1/2008 |
| WO | 2008/148771 | A1 | 12/2008 |
| WO | 2009/015682 | A1 | 2/2009 |
| WO | 2009/050565 | A1 | 4/2009 |
| WO | 2009/065768 | A1 | 5/2009 |
| WO | 2009/065769 | A2 | 5/2009 |
| WO | 2009/080772 | A1 | 7/2009 |
| WO | 2009/080813 | A1 | 7/2009 |
| WO | 2009/116926 | A1 | 9/2009 |
| WO | 2009/124704 | A1 | 10/2009 |
| WO | 2010/046698 | A1 | 4/2010 |
| WO | 2010/084466 | A2 | 7/2010 |
| WO | 2010/087752 | A1 | 8/2010 |
| WO | 2010/094500 | A1 | 8/2010 |
| WO | 2011/058233 | A1 | 5/2011 |
| WO | 2011/087422 | A1 | 7/2011 |
| WO | 2011/087423 | A1 | 7/2011 |
| WO | 2011/087424 | A1 | 7/2011 |
| WO | 2011/129755 | A2 | 10/2011 |
| WO | 2011/129757 | A1 | 10/2011 |
| WO | 2011/141851 | A2 | 11/2011 |
| WO | 2012/004699 | A2 | 1/2012 |
| WO | 2012/076608 | A1 | 6/2012 |
| WO | 2012/141647 | A1 | 10/2012 |
| WO | 2012/154113 | A1 | 11/2012 |
| WO | 2013/056745 | A1 | 4/2013 |
| WO | 2013/079950 | A1 | 6/2013 |
| WO | 2013/139460 | A1 | 9/2013 |
| WO | 2013/139681 | A1 | 9/2013 |
| WO | 2013/167576 | A2 | 11/2013 |
| WO | 2013/182191 | A2 | 12/2013 |
| WO | 2014/017972 | A1 | 1/2014 |
| WO | 2014/109699 | A1 | 7/2014 |
| WO | 2015/078434 | A1 | 6/2015 |
| WO | 2015/078443 | A1 | 6/2015 |
| WO | 2015/078444 | A1 | 6/2015 |
| WO | 2015/105455 | A1 | 7/2015 |
| WO | 2015/105456 | A1 | 7/2015 |
| WO | 2015/174909 | A1 | 11/2015 |
| WO | 2016/151435 | A1 | 9/2016 |

OTHER PUBLICATIONS

Decision to grant received for European Patent Application No. 15735146, mailed on Nov. 18, 2021, 2 pages.

Decision to Grant received for Japanese Patent Application No. 2016-566269, mailed on Jul. 2, 2019, 5 pages (2 pages of English Translation and 3 pages of Original Document).

Decision to Grant received for Japanese Patent Application No. 2019-204866, mailed on Oct. 29, 2021, 5 pages (2 pages of English Translation and 3 pages of Original Document).

European Search Report and Search Opinion received for European Patent Application No. 21214173, mailed on Mar. 9, 2022, 9 pages.

European Search Report and Search Opinion received for European Application No. 23185964.6, mailed on Sep. 19, 2023, 11 pages.

Intention to grant received for European Patent Application No. 15735032, mailed on Feb. 22, 2023, 7 pages.

Intention to grant received for European Patent Application No. 15735146, mailed on Jul. 6, 2021, 6 pages.

Office Action received for Chinese Patent Application No. 201580003660, mailed on Feb. 3, 2017, 18 pages (10 pages of English Translation and 8 pages of Original Document).

Office Action received for Chinese Patent Application No. 201580023028, mailed on Jan. 3, 2018, 19 pages (10 pages of English Translation and 9 pages of Original Document).

Office Action received for Chinese Patent Application No. 201911148535, mailed on May 8, 2021, 9 pages (5 pages of English Translation and 4 pages of Original Document).

Office Action received for Chinese Patent Application No. 202011186324, mailed on Mar. 16, 2022, 15 pages (8 pages of English Translation and 7 pages of Original Document).

Office Action received for European Patent Application No. 15735032, mailed on Jan. 14, 2022, 6 pages.

Office Action received for European Patent Application No. 15735032, mailed on Oct. 15, 2020, 7 pages.

Office Action received for European Patent Application No. 15735146, mailed on Dec. 4, 2019, 7 pages.

Office Action received for European Patent Application No. 15735146, mailed on May 23, 2019, 9 pages.

Office Action received for European Patent Application No. 15735146, mailed on Sep. 24, 2020, 3 pages.

Office Action received for European Patent Application No. 15791987, mailed on Jan. 14, 2022, 8 pages.

Office Action received for European Patent Application No. 15791987, mailed on Jan. 18, 2021, 7 pages.

Office Action received for Japanese Patent Application No. 2016-544402, mailed on Dec. 18, 2020, 9 pages (4 pages of English Translation and 5 pages of Original Document).

Office Action received for Japanese Patent Application No. 2016-544402, mailed on Jul. 12, 2019, 8 pages (4 pages of English Translation and 4 pages of Original Document).

Office Action received for Japanese Patent Application No. 2016-544402, mailed on Jul. 21, 2020, 20 pages (10 pages of English Translation and 10 pages of Original Document).

Office Action received for Japanese Patent Application No. 2016-544402, mailed on Nov. 2, 2018, 10 pages (5 pages of English Translation and 5 pages of Original Document).

Office Action received for Japanese Patent Application No. 2016-566269, mailed on Jan. 29, 2019, 9 pages (5 pages of English Translation and 4 pages of Original Document).

Office Action received for Japanese Patent Application No. 2019-204866, mailed on Feb. 19, 2021, 9 pages (5 pages of English Translation and 4 pages of Original Document).

Office Action received for Korean Patent Application No. 10-2016-7021111, mailed on May 17, 2021, 4 pages (2 pages of English Translation and 2 pages of Original Document).

Office Action received for Korean Patent Application No. 10-2016-7021111, mailed on Nov. 25, 2020, 20 pages (12 pages of English Translation and 8 pages of Original Document).

Supplementary European Search Report and Search Opinion received for European Patent Application No. 15735146, mailed on Jul. 18, 2017, 10 pages.

Supplementary European Search Report and Search Opinion received for European Patent Application No. 15791987, mailed on Jan. 8, 2018, 9 pages.

The Second Office Action received for Chinese Patent Application No. 201580003660, mailed on Oct. 23, 2017, 21 pages (13 pages of English Translation and 8 pages of Original Document).

(56) References Cited

OTHER PUBLICATIONS

The Second Office Action received for Chinese Patent Application No. 201580023028, mailed on Sep. 21, 2018, 19 pages (11 pages of English Translation and 8 pages of Original Document).
The Second Office Action received for Chinese Patent Application No. 201911148535, mailed on Dec. 31, 2021, 16 pages (9 pages of English Translation and 7 pages of Original Document).
BTLSR Toledo, Inc. website, http://www.bltresins.com/more.html. "Advantages to Using Powdered Resins," May 26, 2007, 2 pages, per the Internet Archive WayBackMachine.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Extended European Search Report issued in EP 15735032.3, dated Aug. 30, 2017, European Patent Office, Munich, DE, 11 pages.
Fang, Chang-Hua, et al., "Densification of wood veneers by compression combined with heat and steam," Eur. J. Wood Prod., 2012, pp. 155-163, vol. 70, Springer-Verlag, Germany (available online Feb. 1, 2011).
Floor Daily, "Shaw Laminates: Green by Design," Aug. 13, 2007, 1 pg, Dalton, GA.
International Search Report and Written Opinion, mailed May 7, 2020 in PCT/SE2020/050007, ISA/SE, Patent-och registreringsverket, Stockholm, SE, 19 pages.

Le Fur, X., et al., "Recycling melamine-impregnated paper waste as board adhesives," published online Oct. 26, 2004, pp. 419-423, vol. 62, Springer-Verlag, DE, XP055332791.
Lstiburek, Joseph, "BSD-106: Understanding Vapor Barriers," Apr. 15, 2011, Building Science Corporation, pp. 1-18; (retrieved Sep. 26, 2018 https://buildingscience.com/documents/digests/bsd-106-understanding-vapor- -barriers).
Machine Translation of JP 2011110768 A, Jun. 2011.
Mercene Labs, "Industrial coatings," retrieved Mar. 28, 2020, 2 pages, retrieved from the Internet https://web.archive.org/web/20140825055945/http://www.mercenelabs.com/pro- ducts/coating-of-difficult-substrates/according to the Internet Archive WayBack Machine this page was available on Aug. 25, 2014 (XP055674250).
Mercene Labs, official home page, retrieved Feb. 23, 2017, retrieved from the Internet: http://www.mercenelabs.com/technology/, according to the Internet Archive WayBack Machine this page was available on Jan. 22, 2013.
Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.
Odian, George, "Principles of Polymerization," 1991, 3rd Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
Rittinge et al., entitled "A Building Panel and a Method to Produce Such a Building Panel", filed in the U.S. Patent and Trademark Office Apr. 11, 2022, issued U.S. Appl. No. 17/768,022.
Rittinge et al., entitled "Wood Fibre Based Panel and a Method for Obtaining Such Panel", filed in the U.S. Patent and Trademark Office Apr. 15, 2022, issued U.S. Appl. No. 17/769,594.

\* cited by examiner

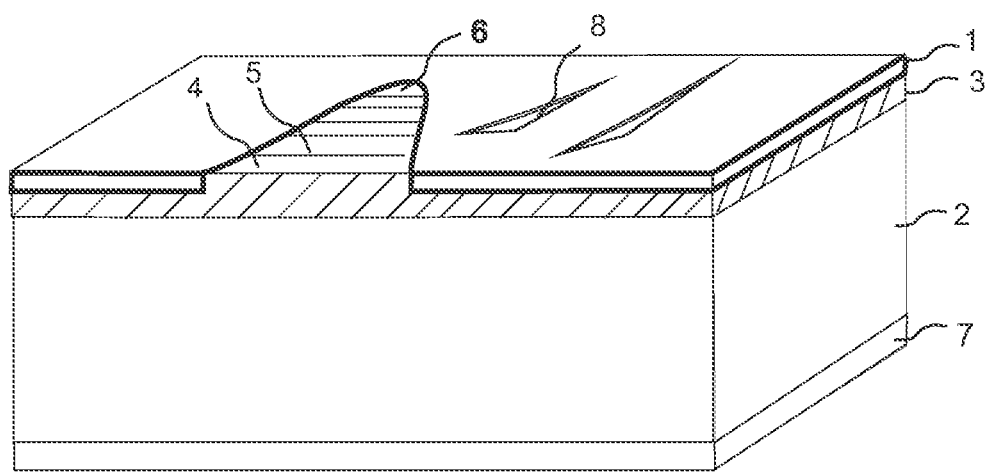

WOOD FIBRE BASED PANEL WITH A SURFACE LAYER

CROSS REFERENCE TO RELATED APPLICATIONS

The present application is a continuation of U.S. application Ser. No. 16/132,977, filed on Sep. 17, 2018, which is a continuation of U.S. application Ser. No. 14/593,521, filed on Jan. 9, 2015, now U.S. Pat. No. 10,100,535, which claims the benefit of Swedish Application No. 1450023-5, filed on Jan. 10, 2014, the benefit of Swedish Application No. 1450552-3, filed on May 12, 2014, and the benefit of Swedish Application No. 1451154-7, filed on Sep. 29, 2014. The entire contents of each of U.S. application Ser. No. 16/132,977, U.S. application Ser. No. 14/593,521, Swedish Application No. 1450023-5, Swedish Application No. 1450552-3, and Swedish Application No. 1451154-7 are hereby incorporated herein by reference in their entirety.

TECHNICAL FIELD

The disclosure generally relates but is not limited to the field of wood fibre based building panels with a surface layer, preferably floor panels, wall panels and furniture components.

TECHNICAL BACKGROUND

Embodiments of the disclosure are particularly suitable for use in floating floors, which are formed of floor panels with a wood fibre core and a decorative wear resistant surface. The following description of known technique, problems of known systems and objects and features of the disclosure will therefore, as a non-restrictive example, be aimed above all at this field of application and in particular at floorings which are similar to traditional wood fibre based laminate floorings.

It should be emphasized that the embodiments of the disclosure can also be used in other applications as, for example, wall panels, ceilings, furniture components, and similar.

Known Technique and Problems Thereof

Several technologies are used to provide a floor panel, which is a copy of a solid floor panel. The reason is that copies may be produced more cost efficient and a floor with a separate layer attached to a core of for example HDF or plywood is more moisture stable than solid wood floors.

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprise two paper sheets, a 0.1 mm thick printed decorative paper and a transparent 0.05-0.1 mm thick overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common surface materials are wood veneer and foils, which are glued to a core. The surface may also be a powder layer comprising wood fibres, melamine resins, colour pigments and aluminium oxide particles.

Wood veneers may provide the most natural copies. The disadvantage is that a wood veneer generally has a lower impact resistance than laminate floors and the production cost is high when high quality veneers may be used It is known that a wood veneer may be pressed on a powder layer as described above and that such a powder layer may provide increased impact resistance. This will not solve the cost problems.

U.S. Pat. No. 2,831,793 discloses a composite wood veneer panel. A thin veneer is applied to a composite fibrous core of ligno-cellulose particles and binder and openings of the veneer are filled with core material when pressed together to form the composite panel. In the manufacture of the plywood or veneered panels according to this document, the plugging of the surface layer opening defects is done simultaneously with the formation of the board.

SUMMARY

The objective of at least certain embodiments of the disclosure is to provide a building panel, such as a floor panel, with a wood based surface layer, which has a more attractive surface design and/or better surface properties and/or cost structure than present known floorings.

At least some of these and other objects and advantages that will be apparent from the description have been achieved by a building panel comprising a surface layer comprising a wood veneer, a wood fibre based core, and a sub-layer arranged between the surface layer and the wood fibre based core. The sub-layer comprises wood fibres and a binder.

The surface layer has surface portions comprising material from the sub-layer extending into the wood veneer.

By extending into the wood veneer is meant that the material from the sub-layer extends, for example, at least into ⅓ of the thickness of the wood veneer. In one embodiment, the material of the sub-layer extends completely through the wood veneer.

The surface portions comprising material from the sub-layer may be flush with a remainder of the surface layer.

In an embodiment, the core may be a wood-based board, for example, a wood-fibre based board such as MDF or HDF, or plywood. The core may be a Wood Plastic Composite (WPC). In an embodiment, the core may be a mineral composite board, a fibre cement board, a magnesium oxide cement board, a ceramic board, or a plastic board such as a thermoplastic board.

Preferably, the core is a pre-fabricated core.

In an embodiment, the veneer layer may be a wood veneer, a cork veneer, or a stone veneer.

In an embodiment, the sub-layer may comprise a filler and a binder. The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The filler may be starch such as maize starch, potato starch, etc.

The thickness of the veneer may be in the range of about 0.2 mm to about 1 mm.

The building panel may be provided with a thinner veneer than known building panels with veneer, since the sub-layer reinforces the veneer.

The building panel may be provided with a partly broken veneer that comprises holes, such as cracks, through the veneer. The sub-layer may protrude through the holes and level the surface layer. The sub-layer may be used as an alternative for putty for a building panel with a broken surface layer. Material from the sub-layer may fill holes, such as cracks, of the veneer.

The veneer may also be pre-treated prior to pressing, for example, be brushed.

The surface layer may comprise embossed portions and a part of the sub-layer may be more compressed under an embossed portion than under a non-embossed surface portion.

The embossed portions may be naturally occurring after pressing. For wood veneers having a porous structure, such as hard wood (e.g., angiosperm), porous portions of the veneer form embossed portions after pressing, since these portions do not spring back from their compressed state when the pressure is released. These porous portions are filled with the binder of the sub-layer during pressing. Then the binder cures and/or hardens, the binder locks the position of the porous portions in the compressed state. The portions of veneer having high density, i.e. being non-porous, are compressed during pressing but spring back when the pressure is released, thus forming protrusions of the surface layer. The high-density portions do not absorb enough binder from the sub-layer to be locked by the hardened binder after pressing.

For wood veneer having a non-porous structure, such as soft wood (e.g., gymnosperm), the summer wood annual rings (also called late wood annual rings), having high density, are not compressible during pressing. Instead, the summer wood annual rings are pressed into the sub-layer such that the sub-layer is compressed. The summer wood annual rings form embossed portions of the surface layer. The spring wood annual rings (also called early wood annual rings) are compressible during pressing. During pressing, the spring wood annual rings are compressed. Then the pressure is released, the spring wood annual rings spring back, and form protrusions.

The embossed portions of the surface layer may also be formed by pressing by an embossed pressing device, such as an embossed press plate.

The building panel may comprise a powder based balancing layer. The powder based balancing layer may comprise cellulose or lignocellulosic particles and a binder. In one embodiment, the building panel comprises a balancing layer comprising a resin impregnated paper, preferably impregnated with a thermosetting binder.

The building panel may be a floor panel comprising a powder based balancing layer. The powder based balancing layer may comprise cellulose or lignocellulosic particles and a binder. In one embodiment, the floor panel comprises a balancing layer comprising a resin impregnated paper, preferably impregnated with a thermosetting binder.

The binder in the sub-layer may be a thermosetting resin.

The binder in the sub-layer may be a melamine resin. The binder in the sub-layer may be an amino resin, such as melamine formaldehyde resin, urea formaldehyde resin, phenol formaldehyde resin, or a combination thereof.

The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The binder may be wood mastic, wood filler or any other type of putty-like paste.

The sub-layer may be substantially or completely formaldehyde free.

The wood fibres in the sub-layer may be lignocellulosic and/or cellulosic particles. The wood fibres may be at least partially bleached.

The sub-layer may comprise wear resistant particles.

The sub-layer may further comprise colour pigments and/or a colorant. The colour pigment may be of dark colour, or may be white, such as TiO2.

The wood veneer may comprise holes and/or cracks, wherein the sub-layer fills the holes and/or cracks of the wood veneer.

The surface layer may further comprise a protective overlay, comprising wear resistant particles, arranged on the wood veneer.

The sub-layer may comprise a foaming agent. Additives such as blowing agents may be included in the sub-layer. The blowing agents may be physical foaming agents such as Expancel® and/or chemical blowing agents such as AIBN (azoisobutyronitrile) or ADC (azodicarbonamide).

The surface layer may be a cork layer.

The building panel may be a floor panel, a wall panel, a ceiling panel, a furniture component, skirting boards, mouldings, edging profiles etc.

An alternative to the veneer may be a paper or a plastic foil provided with apertures that extends through the paper or the plastic foil.

A second aspect of the disclosure is a method to produce a building panel, comprising the step of:
  applying a wood fibre powder and a binder on a wood fibre based core, to obtain a sub-layer;
  applying a wood veneer, comprising holes through the veneer, on the sub-layer,
  applying heat and pressure to bond the veneer, the sub-layer and the wood fibre based core together, wherein a portion of the wood fibre powder and the binder is pressed into the holes.

The method preferably comprises the step of applying a foaming agent. The foaming agent may facilitate the displacement of the wood fibre powder and the agent into the holes.

The wood fibre powder may comprise lignocellulosic particles or cellulose particles.

The method may comprise the step of applying different colour pigments, such that the colour of the visible sub-layer portion varies along the building panel, or such that the portion of the sub-layer in the holes forms a pattern.

After applying pressure, the surface layer may comprise embossed portions, and wherein a part of the sub-layer is more compressed under an embossed surface portion than under a non-embossed surface portion.

The method may further comprise applying a protective overlay with wear resistant particles on the wood veneer, preferably prior to pressing.

The sub-layer may further comprise colour pigments and/or a colorant.

The sub-layer may comprise wear resistant particles.

According to a third aspect of the disclosure, a building panel is provided. The building panel comprises a surface layer comprising a wood veneer, a core, and a sub-layer arranged between the surface layer and the core. The surface layer has surface portions comprising material from the sub-layer extending into the wood veneer.

Preferably, the core is a wood fibre based core.

Preferably, the sub-layer comprises wood fibres and a binder.

BRIEF DESCRIPTION OF THE DRAWINGS

The disclosure will by way of example be described in more detail with reference to the appended schematic drawing, which shows an embodiment of the disclosure.

FIG. 1 illustrates a building panel according to an embodiment of the disclosure.

DETAILED DESCRIPTION

FIG. 1 shows a building panel with a surface layer 1 comprising a wood veneer, a core 2, and a sub-layer 3 arranged between the surface layer 1 and the core 2. The core 2 may be wood fibre based board such as MDF, HDF, particle board, plywood, OSB etc. The core 2 may be a WPC (Wood Plastic Composite). The core 2 may in one embodiment be a mineral board. The building panel may be a floor panel, a wall panel, a ceiling panel, a furniture component, skirting boards, mouldings, edging profiles, etc.

A low quality wood veneer is used as a surface layer 1. The veneer comprises cracks and other similar defects. The veneer is pressed against the core 2 with a powder based sub-layer 3 comprising wood fibres 4 and a binder 5 such that the powder floats and fills the cracks. The panel comprises after pressing a surface layer 1 with surface portions 6 comprising material from the sub-layer 3. The surface portions 6 comprising material from the sub-layer 3 extend into the wood veneer. The surface portions comprising material from the sub-layer may be flush with a remainder of the surface layer. A "surface portion" is a portion of the surface layer that is visible on the exposed surface of the surface layer facing away from the core.

In one embodiment, the sub-layer 3 comprises a binder applied in liquid form.

The panel may be pressed against an embossed press plate such that a part of the sub-layer 3 is more compressed under an embossed portion 8 than under a non-embossed surface portion.

Preferably the building panel is a floor panel that may have a powder based balancing layer 7. A powder based balancing layer 7 may also be applied on any other type of building panel. The powder based balancing layer 7 may comprise lignocellulosic particles or cellulose particles and a binder, preferably a thermosetting binder, more preferably an amino resin such as melamine formaldehyde resin. The binder may also be applied in powder form, the sub-layer 3 being a dry powder layer. In one embodiment, the sub-layer 3 is a pre-pressed layer, wherein the binder has not completely cured during the pre-pressing.

The binder of the sub-layer 3 may be a thermosetting resin, such as, for, example a melamine formaldehyde resin. The sub-layer 3 may also comprise colour pigments and wear resistant particles such as aluminium oxide particles. The wood fibres of the sub-layer 3 may be lignocellulosic particles or cellulose particles. The wood fibres of the sub-layer 3 may be at least partially bleached. The sub-layer may comprise a foaming agent. The wood veneer may be replaced by a cork veneer or a stone veneer.

The sub-layer 3 may be applied in an amount of 200-600 g/m2, preferably 300-500 g/m2 such as about 400 g/m2. The amount of binder applied for the sub-layer 3 may be 100-300 g/m2, preferably 150-250 g/m2 such as about 200 g/m2. The sub-layer 3 may comprise the binder in an amount of 30-80 wt %, preferably in an amount of 40-60 wt % such as about 50 wt %.

In an embodiment, a produced building panel may be 6-25 mm thick, preferably 8-15 mm thick after pressing, while the core may be 5-22 mm thick, preferably 7-14 mm thick. The sub-layer may be 0.1-2 mm thick after pressing.

Using a protective overlay with wear resistant particles applied on the veneer is not excluded and this could increase the wear resistance of a wood veneer. Dry and wet overlays, which are produced by production methods where for example thermosetting resins in dry or wet form are mixed with aluminium oxide, without any fibres could also be used. Aluminium oxide particles mixed with melamine powder could for example be applied on a wood veneer prior to pressing and a wear resistant surface could be obtained without any surface coating after pressing. Dry and wet overlays may be applied on the surface layer prior to pressing. Wax may be applied, for example, as a powder, prior to pressing on the veneer. A lacquer may also be applied on the surface layer after pressing. A protective foil may also be applied on the veneer prior to pressing or on the surface layer after pressing.

It is also contemplated that the building panel is provided with a second surface layer (not shown) comprising a wood veneer of the above described type. A sub-layer of the above described type is arranged between the second surface layer and a second surface of the core of the above described type. The second surface layer has surface portions comprising material from the sub-layer extending into the wood veneer. The second surface of the core faces away from the surface layer described above with reference to FIG. 1. In this embodiment, the surface layer described above with reference to FIG. 1 is considered as first surface layer.

The building panel may be produced by a method comprising the step of:
- applying a wood fibre powder and a binder on a wood fibre based core, to obtain a sub-layer;
- applying a wood veneer, comprising holes through the veneer, on the sub-layer,
- applying heat and pressure to bond the veneer, the sub-layer and the wood fibre based core together, wherein a portion of the wood fibre powder and the binder is pressed into the holes.

The method preferably comprises the step of applying a foaming agent. The foaming agent may facilitate the displacement of the wood fibre powder and the agent into the holes.

The wood fibre powder may comprise lignocellulosic particles or cellulose particles.

The method may comprise the step of applying different colour pigments, such that the colour of the visible sub-layer portion varies along the building panel, or such that the portion of the sub-layer in the holes forms a pattern.

Embodiments

1. A building panel comprising:
   a surface layer comprising a wood veneer,
   a wood fibre based core, and
   a sub-layer arranged between the surface layer and the wood fibre based core, wherein the sub-layer comprises wood fibres and a binder,
   wherein the surface layer has surface portions comprising material from the sub-layer extending into the wood veneer.

2. The building panel as in embodiment 1, wherein the surface portions comprising material from the sub-layer are flush with a remainder of the surface layer.

3. The building panel as in embodiment 1, wherein the surface layer comprises embossed portions and wherein a part of the sub-layer is more compressed under an embossed portion than under a non-embossed surface portion.

4. The building panel as in embodiment 1, wherein the sub-layer comprises colour pigments and/or a colorant.

5. The building panel as in embodiment 1, wherein the sub-layer comprises wear resistant particles.

6. The building panel as in embodiment 1, further comprising a powder-based balancing layer.

7. The building panel as in embodiment 1, wherein the wood veneer comprises holes and/or cracks, wherein the sub-layer fills the holes and/or cracks of the wood veneer.

8. The building panel as in embodiment 1, further comprising a protective overlay comprising wear resistant particles arranged on the surface layer.

9. The building panel as in embodiment 1, wherein the binder in the sub-layer is a thermosetting resin.

10. The building panel as in embodiment 1, wherein the binder in the sub-layer is a melamine formaldehyde resin.

11. The building panel as in embodiment 1, wherein the sub-layer comprises a foaming agent.

12. The building panel as in embodiment 1, wherein the surface layer is a cork layer.

13. A building panel comprising:
a surface layer comprising a wood veneer,
a wood fibre based core, and
a sub-layer arranged between the surface layer and the wood fibre based core, wherein the sub-layer comprises wood fibres, a binder and wear resistant particles,
wherein the surface layer has surface portions comprising material from the sub-layer extending into the wood veneer.

14. A building panel comprising:
a surface layer comprising a wood veneer,
a wood fibre based core, and
a sub-layer arranged between the surface layer and the wood fibre based core, wherein the sub-layer comprises wood fibres, a binder and colour pigments and/or a colorant,
wherein the surface layer has surface portions comprising material from the sub-layer extending into the wood veneer.

15. A building panel comprising:
a surface layer comprising a veneer,
a core, and
a sub-layer arranged between the surface layer and core, wherein the surface layer has surface portions comprising material from the sub-layer extending into the veneer.

16. A method to produce a building panel, the method comprising:
applying a wood fibre powder and a binder on a wood fibre based core, to obtain a sub-layer;
applying a wood veneer, comprising holes through the veneer, on the sub-layer,
applying heat and pressure to bond the veneer, the sub-layer and the wood fibre based core together, wherein a portion of the wood fibre powder and the binder is pressed into the holes.

17. The method as in embodiment 16, further comprising applying a foaming agent in the sub-layer.

18. The method as in embodiment 16, wherein the wood fibre powder comprises lignocellulosic particles or cellulose particles.

19. The method as in embodiment 16, further comprising applying different colour pigments, such that the colour of the visible sub-layer portion varies along the building panel, or such that the portion of the sub-layer in the holes forms a pattern.

20. The method as in embodiment 16, wherein after applying pressure, the wood veneer comprises embossed portions, and wherein a part of the sub-layer is more compressed under an embossed surface portion than under a non-embossed surface portion.

21. The method as in embodiment 16, further comprising applying a protective overlay with wear resistant particles on the wood veneer, preferably prior to pressing.

22. The method as in embodiment 16, wherein the sub-layer comprises colour pigments and/or a colorant.

23. The method as in embodiment 16, wherein the sub-layer comprises wear resistant particles.

The invention claimed is:

1. A method to produce a building panel, the method comprising:
applying a first sub-layer comprising wood fibres, a filler and a binder on a first side of a wood fibre based core, the filler consisting of a starch;
applying a first wood veneer on the first sub-layer to form a first surface layer,
applying heat and pressure to bond the first wood veneer, the first sub-layer and the wood fibre based core together, whereby material from the first sub-layer is pressed into holes and/or cracks of the first wood veneer,
wherein the first surface layer has a surface portion comprising material from the first sub-layer extending into the first wood veneer.

2. The method according to claim 1, wherein the binder is applied on the wood fibre based core in liquid form.

3. The method according to claim 1, further comprising applying a second surface layer, wherein the second surface layer is on a second side opposite the first side of the wood fibre based core, wherein the second surface layer comprises a second sub-layer of a wood fibre powder and a binder, and a second wood veneer on the second sub-layer.

4. The method as claimed in claim 1, wherein the first surface layer comprises embossed portions and protrusions, wherein the binder of the first sub-layer bonds porous portions of the first wood veneer in a compressed position to form the embossed portions, and wherein the binder does not bond non-porous portions of the first wood veneer in the compressed position so that non-porous portions of the first wood veneer form the protrusions.

5. The method according to claim 1, further comprising applying a protective layer on the first surface layer prior to applying heat, or prior to applying heat and pressure.

6. The method according to claim 1, wherein the sub-layer comprises the binder in an amount of 40-60 wt %.

7. The method according to claim 1, wherein the filler consists of a maize or potato starch.

8. A method to produce a building panel, the method comprising:
applying a first sub-layer comprising wood fibres, a filler and a binder on a first side of a wood fibre based core, the filler comprising a starch, the filler being free of cellulose;
applying a first wood veneer on the first sub-layer to form a first surface layer,
applying heat and pressure to bond the first wood veneer, the first sub-layer and the wood fibre based core together, whereby material from the first sub-layer is pressed into holes and/or cracks of the first wood veneer, wherein the first surface layer has a surface portion comprising material from the first sub-layer extending into the first wood veneer.

9. The method according to claim 8, wherein the first sub-layer is powder based.

10. The method according to claim 8, further comprising applying a second surface layer, wherein the second surface layer is on a second side opposite the first side of the wood fibre based core, wherein the second surface layer comprises a second sub-layer of a wood fibre powder and a binder, and a second wood veneer on the second sub-layer.

11. The method as claimed in claim 8, wherein the first surface layer comprises embossed portions and protrusions, wherein the binder of the first sub-layer bonds porous portions of the first wood veneer in a compressed position to form the embossed portions, and wherein the binder does not bond non-porous portions of the first wood veneer in the compressed position so that non-porous portions of the first wood veneer form the protrusions.

12. The method according to claim 8, wherein the first sub-layer comprises colour pigments and/or a colorant.

13. The method according to claim 8, wherein the sub-layer comprises the binder in an amount of 40-60 wt %.

14. The method according to claim 8, wherein the filler comprises a maize or potato starch.

15. A method to produce a building panel, the method comprising:
applying a first sub-layer comprising wood fibres, a filler and a binder on a first side of a wood fibre based core, the filler comprising a maize or potato starch;
applying a first wood veneer on the first sub-layer to form a first surface layer,
applying heat and pressure to bond the first wood veneer, the first sub-layer and the wood fibre based core together, whereby material from the first sub-layer is pressed into holes and/or cracks of the first wood veneer,
wherein the first surface layer has a surface portion comprising material from the first sub-layer extending into the first wood veneer.

16. The method according to claim 15, wherein the binder is applied on the wood fibre based core in liquid form.

17. The method according to claim 15, further comprising applying a second surface layer, wherein the second surface layer is on a second side opposite the first side of the wood fibre based core, wherein the second surface layer comprises a second sub-layer of a wood fibre powder and a binder, and a second wood veneer on the second sub-layer.

18. The method as claimed in claim 15, wherein the first surface layer comprises embossed portions and protrusions, wherein the binder of the first sub-layer bonds porous portions of the first wood veneer in a compressed position to form the embossed portions, and wherein the binder does not bond non-porous portions of the first wood veneer in the compressed position so that non-porous portions of the first wood veneer form the protrusions.

19. The method according to claim 15, wherein the first sub-layer is substantially formaldehyde free.

20. The method according to claim 15, wherein the sub-layer comprises the binder in an amount of 40-60 wt %.

* * * * *